United States Patent [19]

Girard

[11] Patent Number: 4,897,141

[45] Date of Patent: Jan. 30, 1990

[54] METHOD FOR PREPARING SEMICONDUCTOR WAFERS

[75] Inventor: Richard T. Girard, Coventryville, Pa.

[73] Assignee: Valtech Corporation, Eagle, Pa.

[21] Appl. No.: 204,339

[22] Filed: Jun. 9, 1988

Related U.S. Application Data

[63] Continuation-in-part of Ser. No. 946,396, Dec. 24, 1986, abandoned, which is a continuation of Ser. No. 678,724, Dec. 6, 1984, abandoned.

[51] Int. Cl.[4] .................................. B32B 31/00

[52] U.S. Cl. .................................. 156/250; 156/276; 156/307.3; 156/330; 156/344; 428/313.9; 437/226; 437/249; 521/91; 523/444

[58] Field of Search ............... 156/330, 276, 250, 344, 156/307.3; 523/444; 521/91; 428/313.9; 437/226, 249

[56] References Cited

U.S. PATENT DOCUMENTS 3,652,486 3/1972 Young .................................. 523/444

*Primary Examiner*—John J. Gallagher

[57] ABSTRACT

Profound improvements and advantages are realized in the process of cutting semiconductor ingots to provide wafers if the adhesive used to bond said ingot to a mounting or cutting beam contains hollow microspheres.

1 Claim, No Drawings

METHOD FOR PREPARING SEMICONDUCTOR WAFERS

This application is a continuation in part of my co-pending U.S. patent application Ser. No. 946,396, filed Dec. 24, 1986, now abandoned which in turn was a continuation of U.S. patent application Ser. No. 678,724, filed Dec. 6, 1984, now abandoned.

BACKGROUND OF THE INVENTION

My invention relates to an improved method of cutting or slicing wafers from ingots of semiconductor materials. In particular, my method involves the addition of hollow microspheres to the adhesive that bonds said ingot to a mounting beam during the slicing operation.

The preparation of substrates, usually silicon, for the fabrication of semiconductor and photovoltaic devices requires a number of precisely controlled chemical and mechanical steps. The substrate material is first prepared in a very pure state by whatever preparation and refining methods are required. This material is then crystallized to provide a very large single crystal in the form of a cylindrical ingot. These ingots are then sawed or sliced into wafers that are usually lapped and polished to provide a flat surface for the production of sophisticated electronic coponents.

Slicing the ingots into wafers is a very important step in the process, since the wafers must be of uniform thickness, have a flat profile and be free of stress produced by slicing. One of the factors that is required to achieve these requirements is that the ingot be held very securely during the slicing operation. The method currently used involves bonding the ingot to a cutting or mounting beam, which is usually graphite, with an epoxy resin or wax. The graphite cutting beam is coated with the epoxy, and the silicon ingot is placed on the beam. The epoxy cures for 12 to 16 hours before a diamond saw or wire saw is used to slice the ingot into wafers. The saw cuts the wafers, the adhesive and part of the mounting beam. The wafers are removed from the cutting beam by breaking the epoxy adhesive bond by mechanical or chemical means.

Many of the problems associated with slicing the ingot are attributable to, or complicated by, the epoxy adhesive. The long cure time required to minimize heat induced stress is an obvious problem. The epoxy can be cured much faster, but with the penalty of a higher exotherm and more heat-induced stress. During cutting, the inside diameter saw blade or wire saw penetrates the adhesive and part of the mounting beam as well as the silicon ingot. Debris from these cuts, especially from the epoxy, clogs the diamond-nickel matrix of the saw blade, and periodically an operator must dress the blade manually with an abrasive dressing stick to prevent damage to the wafers. The problems add time and cost to the process. In addition, removal of the sliced wafers from the cutting beam is accomplished by breaking the wafer/ingot bond. Chipping and rejects are common with epoxies. A very small error in the proportions of the epoxy components can result in a very large number of rejects.

The wafer fabricating industry would consider an additive that addresses one of these problems a great improvement. A single additive to the system that prevents or ameliorates thermally induced stress and the clogging problem as well as reducing rejects provides a profound change in the system.

It is an object of this invention to provide an improved epoxy system that includes hollow microspheres, allowing faster, stress-free cure times, cleaner slicing and improved separation of the bonded part from the support beam when used for bonding ingots to a cutting beam.

SUMMARY OF THE INVENTION

I have found that the method of slicing silicon metal ingots to provide wafers for the semiconductor industry can be profoundly improved by including hollow microspheres in the adhesive used to fix the ingot to the mounting or cutting beam during slicing. Up to 50% by volume of the small hollow microspheres can be included in the epoxy before mixing it with the hardener and applying it to the mounting beam and silicon ingot. The advantages that stem from this change in the system are unusually significant for the industry, as well as surprising. The silicon wafers exhibit reduced edge chipping as the result of cutting, indicating that there is less stress at the interface of the adhesive and the ingot. This reduced stress is attributed to a reduction in the thermal effects induced by a strong exotherm that develops as the epoxy cures. The industry has attempted to ameliorate these heat-induced stresses by stretching out the cure time to nearly 16 hours. This long cure time reduces the temperature to which the ingot and mounting beam are exposed. The adhesive containing the microspheres develops considerably lower temperatures as it cures, and it can be cured in less than 10 hours and preferably less than 5 hours. It is a very significant and unpredictable result that the cure time could be reduced while thermally induced stress is also reduced. Blinding and/or clogging of the saw blade with debris, mostly resin relics, is drastically reduced. Part of this reduction comes about simply because the absolute amount of epoxy resin is reduced. The larger part and unexpected portion of the reduced clogging is the result of a wiping or cleaning action provided by the hollow microspheres. The debris lodges in the small holes created when the microsphere is cut or fractured. Slicing of the ingot now requires less dressing, and the life of the diamond saw blade is extended. Preventing resin build-up on the diamond-nickel matrix of the saw blade provides an additional and very significant result. Less exit chipping of the wafer is found when the microspheres are included. If epoxy debris adheres to the saw, the dimensions of the diamond-nickel matrix that actually does the cutting changes. Such changes cause strain and the exit chipping, as well as wafer profile problems. Dressing of the blade causes deflection of the blade and increased rejects. Inclusion of the microspheres prevents these problems and reduces rejects to a great degree. The inclusion of the hollow microspheres provides a further advantage in that fewer imperfections and lower breakage occur when the adhesive bond is broken to separate the wafer from the mounting beams. The microspheres facilitate breaking this bond. It is an unexpected result that the bond between the wafers and the beam can be of a limited or temporary nature, while the bond between the ingot and the beam is secure enough to provide the dimensional stability required for accurate and precise slicing of the wafers.

THE INVENTION

The adhesive consists of a resin and hollow microspheres. The resin can be any curable organic polymer system that is compatible with hollow microspheres, and the hollow microspheres added to the resin systems to form the improved adhesive can be of nearly any composition so long as they do not degrade said resin. Two-part epoxy resins are preferred. The ingot can be of any semiconductor or photovoltaic material required, but is usually silicon or gallium arsenide. The slicing beam can be of any relatively inert material that provides rigid support for the ingot; graphite is usually used.

The hollow microspheres can be fused glass microspheres such as those described in U.S. Pat. Nos. 3,365,315 and 3,838,998 or silicate-based microspheres described in U.S. Pat. Nos. 2,797,201; 2,978,340; 3,030,215; 3,699,050; 4,059,423 and 4,063,916. Hollow microspheres of various materials including glass and metals can be prepared by the methods disclosed in U.S. Pat. Nos. 4,279,632 and 4,344,787, and these materials are also useful. These nine patents are hereby incorporated by reference as describing materials that are useful in my invention.

Hollow microspheres that are of particular interest are those with shells that are composed of alkali metal silicate and a "polysalt." These materials are described in U.S. Pat. No. 3,796,777, hereby incorporated by reference. The microspheres are prepared by spray drying a homogeneous solution of a silicate and a polysalt selected from the group of ammonium pentaborate, sodium pentaborate and sodium hexametaphosphate, and then further drying to reduce the water content from above about 10% to less than about 7%.

The size of the microspheres can vary widely, but the diameter should not be such that detrimental weakening of the epoxy bond is realized. In general, microspheres with average diameters of 1 to 500 micrometers appear to be useful. The amount of microspheres to be used with the epoxy system can also vary widely, with the upper limit being the amount that would diminish the epoxy bond strength so that the dimensional stability of the ingot beam unit would be diminished. Useful amounts of the microspheres vary from about 2% to about 35% of the resin composition by weight. The microspheres should not contribute substantially more than 50% of the volume of the adhesive system.

The cutting or mounting beam can be of any composition or design as long as it provides the required stability. The improved method of my invention is carried out by mixing the required amount of hollow microspheres with the resin part of the adhesive. The resin is then mixed with hardener or promoter to provide a set/cure time of 4 to 6 hours. The adhesive system is then applied to the mounting beam and the ingot. They are united, held in position, and the adhesive allowed to set and cure. The exotherm generated during cure minimizes stress in the ingot/beam structure. After setting, the ingot/beam structure is placed in a cutting or slicing machine. The inside diameter diamond saw cuts the ingot, the epoxy and part of the mounting beam. After cutting, the now fabricated wafers remain attached to the mounting beam. They are removed by breaking the bond with the beam by mechanical or chemical means.

EXAMPLES

The following examples illustrate certain embodiments of our invention and of the prior art. These examples are not presented to establish the scope of the invention, which is fully disclosed in the specification and recited in the claims. The proportions are in parts by weight (pbw) or percent by weight (% wt/wt) unless otherwise indicated.

EXAMPLE 1

This example illustrates the bonding of a silicon ingot to a graphite cutting beam by a method of the prior art. A commercial epoxy resin is prepared that contains the resin, calcium carbonate and a silica thickener. Sufficient hardener is added to provide a cure time of 12 to 14 hours. The resin system is then spread on the graphite beam and the ingot is placed thereon. After 12 to 14 hours the ingot is cut with a diamond saw to provide wafers. Upon removing the wafers from the graphite beam the epoxy bond proves so strong that some wastage of the wafers is experienced.

EXAMPLE 2

This example illustrates the bonding of a silicon ingot to a graphite cutting beam by the improved method of my invention. A commercially available epoxy resin (56.9 pbw) is mixed with 30.9 pbw of calcium carbonate and 1.9 pbw of fumed silica. This mixture is prepared using high shear. The homogeneous mixture is heated to reduce the viscosity, and 10.3 pbw of hollow microspheres is blended into the resin mixture at lower shear. This resin mixture is then mixed with sufficient hardener to cause setting of the epoxy in about 5 hours. This system is spread on the graphite cutting beam and the silicon ingot placed thereon. After about 5 hours the epoxy is set with no apparent strain induced into the silicon ingot. Cutting of the ingot is simpler since the saw does not become fouled with epoxy waste as often when compared to the process of example 1. Removal of the resulting silicon wafers is easier also, and there is less waste since the epoxy bond seems to part with more ease than observed in the process of example 1.

EXAMPLE 3

This example illustrates that addition of the microspheres to the epoxy provides a reduction in the bond strength of the epoxy so that removal of the wafer from the beam is improved, but the bond strength is not so reduced that the ingot is not secure on the beam. A commercially available epoxy was formulated with about 6 pbw of fillers for each 10 pbw of epoxy. This epoxy was then combined with hollow microspheres (Q-CEL ® 120 microspheres, a product of PQ Corporation). Steel panels were bonded and the shear required to break the bonds was measured. The results are summarized in the following table.

TABLE 1

| Run | Q-CEL ® (pbw) | Force[a] (psi) |
|---|---|---|
| A | 5.0 | 598 |
| B | 2.5 | 788 |
| C | — | 873 |

[a]Seven specimens were tested-the high and low values were eliminated. The force at failure is an average of the remaining five values.

I claim:

1. The process of preparing semiconductor wafers from ingots by bonding said ingots to a cutting beam with an epoxy adhesive and slicing the ingot into wafers, said process comprising the steps of:

a. mixing hollow microspheres of an average diameter of 1 to 500 micrometers as the single additive that prevents or ameliorates thermally induced stress and the clogging problem during slicing with the resin part of an epoxy adhesive, wherein sufficient hollow microspheres are used to provide 2 to 35% (wt/wt) of the total adhesive, wherein the hollow microspheres are formed from silicate glass melts or from a homogeneous solution of alkali metal silicate and a polysalt selected from the group consisting of ammonium pentaborate, sodium pentaborate and sodium hexametaphosphate;

b. mixing a sufficient amount of a hardener for the epoxy adhesive with the mixture of step a. to provide a set time of 4 to 12 hours;

c. spreading the mixed adhesive system on said cutting beam and/or semiconductor liquid;

d. placing said cutting beam and silicon ingot in contact with each other;

e. allowing the adhesive to set;

f. slicing the ingot into wafers with an inside diameter diamond or wire saw that penetrates the ingot, adhesive and part of the cutting beam; and g. recovering the wafers by breaking the adhesive bond between the semiconductor wafer and the cutting means.

* * * * *